Figure 1:
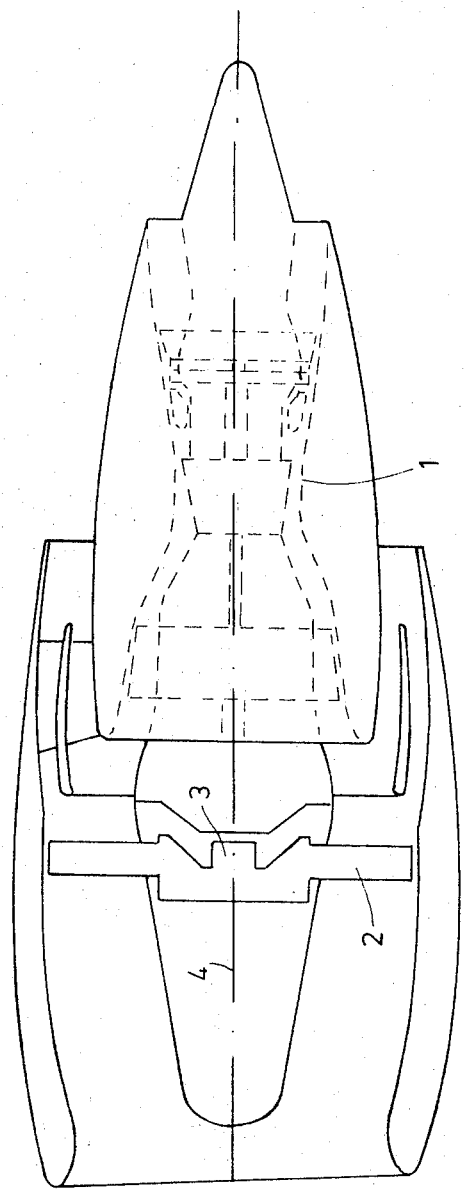

United States Patent [19]

McMurtry

[11] 3,781,131
[45] Dec. 25, 1973

[54] VARIABLE PITCH ROTARY BLADING
[75] Inventor: David Roberts McMurtry, Bristol, England
[73] Assignee: Rolls-Royce, Limited, London, England
[22] Filed: Apr. 28, 1972
[21] Appl. No.: 248,410

[30] Foreign Application Priority Data
May 6, 1971  Great Britain .................. 14,173/71

[52] U.S. Cl. ............................................. 416/155
[51] Int. Cl. .......................................... B64c 11/06
[58] Field of Search ............ 416/145, 139, 155–157, 416/167, 89, 136

[56] References Cited
UNITED STATES PATENTS
2,460,559  2/1949  Wildhaber ............................ 416/89
2,514,477  7/1950  Cushman ............................... 416/89
2,533,358  12/1950  Cushman ............................... 416/89
3,663,119  5/1972  Brooking et al. .................... 416/157
3,687,569  8/1972  Klompas ......................... 416/145 X FOREIGN PATENTS OR APPLICATIONS
1,370,754  7/1964  France ................................ 416/136

Primary Examiner—Everette A. Powell, Jr.
Attorney—Richard K. Stevens et al.

[57] ABSTRACT

In a variable pitch fan gas turbine engine an actuator for changing the pitch of the blades is connected to each blade through two driving connections in parallel. The first driving connection is a relatively flexible shaft, and the second is a relatively stiff hollow shaft which surrounds the first shaft and is connected to it by means of splines. This arrangement allows for bending of the first-mentioned shaft and tilting of the hollow shaft to provide for relative movements between the actuator and the blades.

4 Claims, 2 Drawing Figures

VARIABLE PITCH ROTARY BLADING

The present invention relates to pitch changing mechanism for variable pitch rotary blading.

According to the present invention, there is provided a rotor, a plurality of blades mounted on said rotor for rotation about their longitudinal axes to vary their pitch and a pitch changing mechanism for effecting said rotation, said pitch changing mechanism comprising an actuator, a plurality of driving members each defining a first driving connection between the actuator and one of the blades, and a plurality of driving elements each defining a second driving connection between the actuator and a respective one of the blades in parallel with the first connection, said driving elements each being adapted to allow deflection of the respective driving member whilst being capable of transmitting the torque required to vary the pitch of the blade in operation.

In a preferred form of the invention the driving members are relatively flexible, and the driving elements are relatively stiff, the driving connections formed thereby being such that the driving members are capable of bending to a greater degree than the driving elements and the driving elements are capable of tilting thus allowing for relative lateral movement between the blade and the actuating means.

Also preferably each driving member comprises a first shaft which is relatively flexible and each driving element comprises a second relatively stiff hollow shaft in the form of a cylinder of a frustum of a cone which surrounds the first shaft.

The first driving connections between the actuator preferably include a pair of toothed annular members driven by the actuator in opposite directions and engaging a toothed wheel on one end of each of the driving members, the other side of the driving members being connected to the blades, for example, by means of screw threads.

The second driving connections between the actuator and the blades include a splined connection between each driving element and the toothed wheel on the respective driving member at one end of the element, and a splined connection between the element and the blade at the other end of the element. The invention will now be more particularly described, merely by way of example, with reference to the accompanying drawings in which:

FIG. 1 is a diagrammatic view of a variable pitch fan engine incorporating the pitch changing mechanism the present invention.

Figure 2:
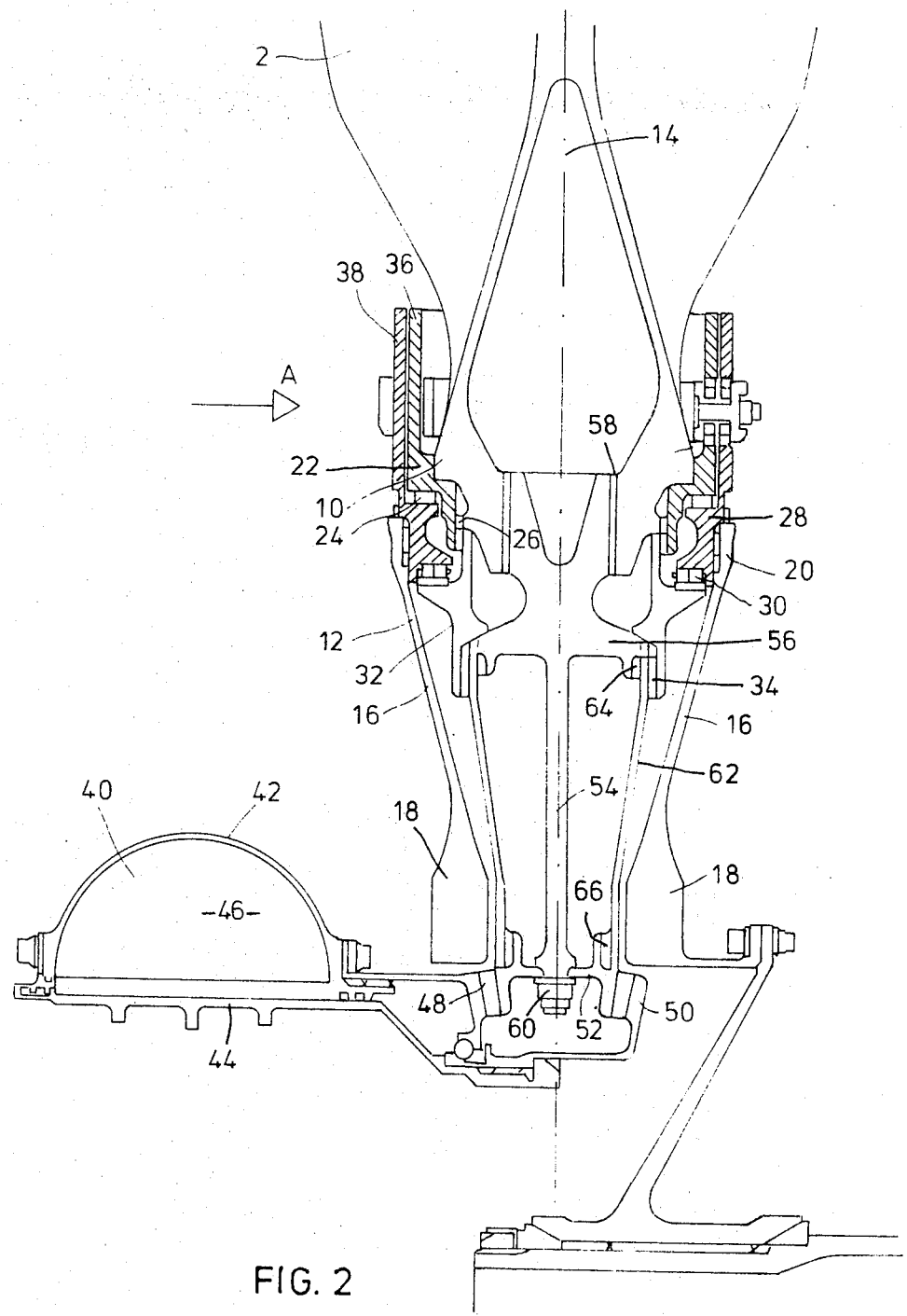

FIG. 2 is a sectional elevation of a fan blade and rotor showing the pitch changing mechanism in greater detail. Referring now to the drawings a gas turbine engine comprises a gas generator or core engine 1 which drives a fan 2 through a gear box 3. The core engine comprises the usual compressor, combustion equipment and turbine (not shown) as are well known in the art, all of which rotate about a main engine axis 4.

Referring to FIG. 2, the blades of the fan 2 each have a root portion 10 which is mounted on a rotor 12 for rotation of its respective fan blade about the longitudinal axis 14 thereof. The rotor is in the form of a disc which is of open-ended channel section, having two inclined side walls 16 terminating in radially inner hub portions 18 and a radially outer end wall 20.

The end wall 20 defines a series of circumferentially spaced circular apertures into which the circular roots 10 of the blades extend. Each blade root is mounted in the outer race 22 of a bearing 24 and is splined to the outer race by means of splines 26. An inner race for the bearing 24 is provided by a ring 28 which is screwed into one of the circular apertures in the end wall of the disc, and which also provides the outer race for a second bearing 30. The inner race for the bearing 30 is provided by a driving ring 32 which is splined to a pitch changng mechanism (described below) at 34, and to the outer race 22 of the bearing 24.

The outer and inner races of the bearing 24 have cylindrical extensions 36 and 38 which respectively form a cam member and reaction means for a mechanism designed to counter-balance the centrifugal turning moments on the blades. This mechanism is not described in detail since it is not relevent to the present invention.

A variable pitch mechanism extends up through the hollow interior of the disc so that the pitch (i.e., angle of attack) of the blades can be varied. The mechanism comprises an actuator in the form of a vane motor 40 which has a semi-circular outer casing 42 carrying integrally radially inwardly extending vanes, and a cylindrical inner casing 44 carrying a second set of vanes which co-operate with the vanes on the outer casing to form chambers 46 into which hydraulic fluid under pressure can be pumped. The outer casing and the inner cylinder rotate in opposite directions under the influence of the hydraulic fluid and are connected with toothed annular members 48 and 50 respectively. A toothed bevel 52 meshes with the teeth of both annular members 48 and 50 and acts via a radially extending driving member in the form of a first shaft 54 to change the pitch of the blades.

The shaft 54 is formed integrally with a blade connecting member 56 which screws into the root 10 of the blade by means of screw threads 58. A nut 60 connects the whole assembly together. Thus the toothed bevel 52, the shaft 54 and the member 56 provide a first driving connection between the actuator 40 and the blade.

Additionally the shaft is surrounded by a driving element 62 in the form of a hollow frusto-conical second shaft which is splined at its radially outer ends to the connecting member 56 by means of splines 64, and to the driving ring 32 by means of the splines 34. The driving element 62 is connected at its radially inner end to the driving bevel 52 by means of splines 66.

The driving elements 62 thus provide a second parallel driving path for the torque for changing the fan blade pitch, between the bevel 52 and the blade root 10. Because of this provision the driving shaft 54 is made relatively flexible compared to the surrounding frusto-conical member 62 which is relatively stiff. The shaft 54 is capable of bending and the frusto-conical driving element 62 is capable of tilting at the same time, such movement being accommodated by the splines 34, 64 and 66, when there is a transverse load on bevel gear 52. This arrangement allows movement of the bevel gear 52 relative to the blade root 10 in a number of circumstances the two most important of which are: — a. There may be a discrepancy between the mating of the toothed annular members 48,50 with any bevel gear 52. This is accommodated by deflection of the bevel gear to compensate and equalise the load sharing of members 48 and 50.

b. Under certain conditions of operation, for example, when the fan or propeller blades are turned rapidly into reverse pitch during forward movement of the aircraft, the blades momentarily vibrate with large amplitude. If the connection between the bevel gear 52 and the root portion 10 were rigid, this blade deflection could cause damage to the gear teeth of gears 48, 50 and 52. This is avoided by the flexible connection between root portion 10 and gear 7 which does not transmit the damaging vibratory motion.

This feature also enables the size and thus the weight of the bevel 52 and the toothed annular members 48 and 50 to be minimised.

Although the embodiment described above includes a vane motor 40 as an actuator, clearly other forms of actuator may be employed, for example, a gear mechanism, and other modifications may be made without departing from the scope of the invention.

I claim:

1. Variable pitch rotary blading including a rotor, a plurality of blades mounted on the rotor for rotation about their longitudinal axes to change their pitch, and a pitch changing mechanism, said mechanism comprising an actuator, a pair of annular driving members driven by the actuator, a plurality of driven members one for each blade, means including a relatively flexible shaft for connecting each of the driven members with a respective blade, the annular driving members driving onto diametrically opposite sides of all of said driven members, a plurality of relatively rigid tubes each including means for providing a driving connection between a driven member and a respective blade whereby torque from the driven member is transmitted to the blades, said means for providing a driving connection including means allowing tilting of the tubes to allow for misalignment of the driven members and the driving members, the shafts being sufficiently flexible so that they can bend when the tubes tilt whereby the driven members are moved to compensate for said misalignment.

2. Variable pitch rotary blading according to claim 1 and wherein the driving members are annular gears and the driven members are gear wheels.

3. Variable pitch rotary blading according to claim 1 and wherein the said means for providing a driving connection between a driven member and a respective blade comprises a splined connection.

4. Variable pitch rotary blading according to claim 1 and wherein the relatively stiff tube surrounds the relatively flexible shaft.

* * * * *